Jan. 13, 1959  Z. REUTT  2,868,441
PLASTIC BLADES, PARTICULARLY FOR A COMPRESSOR
ROTOR OF A GAS TURBINE ENGINE
Filed Feb. 7, 1955

INVENTOR
Z. REUTT
By Mawhinney + Mawhinney
ATTYS.

United States Patent Office 2,868,441
Patented Jan. 13, 1959

2,868,441

PLASTIC BLADES, PARTICULARLY FOR A COMPRESSOR ROTOR OF A GAS TURBINE ENGINE

Zigmund Reutt, Coventry, England, assignor to Armstrong Siddeley Motors Limited, Coventry, England Application February 7, 1955, Serial No. 486,647

Claims priority, application Great Britain February 24, 1954

2 Claims. (Cl. 230—134)

This invention relates to a gas turbine engine compressor blade, formed of synthetic resin-impregnated cloth laminations bonded together, and having a divergent root.

Blades of this kind are attached to a support by nesting the divergent root in a corresponding slot in the support. In the case of a compressor rotor blade, in order to withstand the centrifugal loads on the blade, the angle of divergence should be as large as possible; but it is considered that a maximum of about 60° divergence can be expected of the laminations if the blade is not to fracture where it joins the root.

In the United States of America it has been proposed to form the root by dividing the laminations at this end into two equal portions, bending them outwardly in opposite directions the requisite amount and retaining them in this position by means of a metal wedge having an angle of not more than 60° inserted between and bonded to the adjacent inner surfaces of the divergent portions. This, however, leads to the disadvantage that under high tensile loads there is a tendency for the wedge to be squeezed out of the root, thus resulting in a loose blade mounting.

It is the main object of the present invention to avoid this disadvantage in a very simple manner.

According to the invention, the root includes a number of wedge-shaped inserts, fabricated from metal or other appropriate hard material and diverging away from the blade, which are bonded on both sides, in the interior of the root, to adjacent laminations; some, at least, of the laminations constituting part of the blade.

Figures 1, 2:
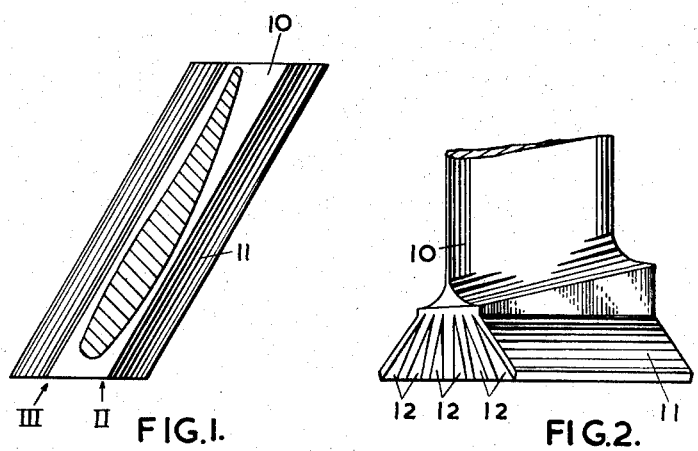
Figure 1 is a sectional plan of part of a gas turbine engine compressor rotor blade embodying the invention.
Figure 2 is a front elevation seen in the direction of arrow II (Figure 1), showing particularly the root of the blade embodying inserts according to the present invention.

In the drawings is shown a blade 10 (Figures 1 and 2), formed of a number of laminations of glass cloth impregnated with epoxy resin and bonded together. The blade 10 has a root 11 comprising six wedge-shaped metallic inserts 12, diverging away from the blade 10, and bonded to the adjacent group of laminations 13 (Figure 3) on both sides of each insert 12 so that the inserts are interleaved with groups of the laminations.

Figure 3:
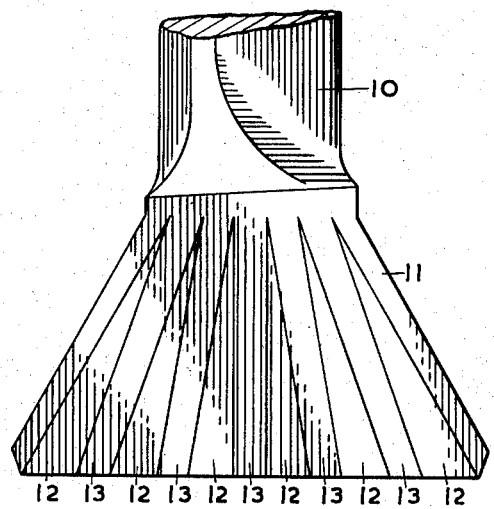
Figure 3 is an enlarged axial elevation in the direction of arrow III (Figure 1).

One of the inserts 12 is shown in Figure 3 and it is seen to be of the full length of the root 11 and to have an angle, at its apex, of 10°, the total angle subtended by the root 11 being approximately 60°.

The laminated blade and root so formed can be bonded together by moulding under the application of heat and pressure to a predetermined initial shape, and the surfaces of the blade, and root where necessary, can also be machined to the final form required. After machining to the shape shown in Figure 1 some of the laminations to which the inserts are bonded will form part of the blade though others, of course, will stop short at the upper edge of the root.

Other appropriate synthetic resins, and combinations thereof can be used for impregnating the laminations of cloth; and the inserts can be formed of other appropriate hard materials such as plastics or resin-impregnated and compressed woods.

What I claim as my invention and desire to secure by Letters Patent of the United States is:

1. A gas turbine engine compressor blade, the blade being formed of synthetic, resin-impregnated, cloth laminations bonded together and having an outwardly divergent root portion extending chord-wise of the blade, said root portion having the outer divergent faces thereof forming angles of approximately 60° with the base face thereof, the root portion having only six imperforate wedge-shaped metal inserts of small wedge angle extending chord-wise of the blade interleaved with groups of said laminations and diverging away from the blade for the sum of their wedge angles to provide the root portion divergence, and means bonding on both sides, in the interior of the root portion, the inserts to adjacent laminations, at least some of the laminations extending spanwise of the blade and forming a part of the air impelling portion of the blade, the angle subtended by each insert being approximately 10°.

2. A blade as claimed in claim 1, wherein the resin is epoxy and the cloth is glass.

References Cited in the file of this patent

UNITED STATES PATENTS

| 1,035,364 | Leblanc | Aug. 13, 1912 |
| 1,459,335 | Leitner | June 19, 1923 |
| 2,372,929 | Blessing | Apr. 3, 1945 |
| 2,621,140 | Bitterli et al. | Dec. 9, 1952 |

FOREIGN PATENTS

| 405,617 | Italy | Aug. 23, 1943 |
| 502,409 | Great Britain | Mar. 13, 1939 |
| 591,135 | Great Britain | Aug. 8, 1947 |

OTHER REFERENCES

Aviation Week, "Glass-Plastic Blade Passes 100 Hour Test," pages 43–46.

Modern Plastics, publication, pages 113, 114, 116, 118, 120 and 122.

Aviation Week, publication, pages 110, 114.